United States Patent [19]

Loveland

[11] 4,345,479

[45] Aug. 24, 1982

[54] FLOWMETER SYSTEM WITH SYNCHRONOUS CLOCK FOR GENERATION OF TIMING SIGNALS

[75] Inventor: Robert S. Loveland, West Covina, Calif.

[73] Assignee: The Perkin-Elmer Corporation, Norwalk, Conn.

[21] Appl. No.: 224,783

[22] Filed: Jan. 13, 1981

[51] Int. Cl.³ .............................................. G01F 1/66
[52] U.S. Cl. ................................................ 73/861.28
[58] Field of Search ........... 73/861.27, 861.28, 861.29, 73/861.31

[56] References Cited

U.S. PATENT DOCUMENTS 4,164,865  8/1979  Hall et al. ........................ 73/861.27

Primary Examiner—Herbert Goldstein
Attorney, Agent, or Firm—S. A. Giarratana; E. T. Grimes; T. P. Murphy

[57] ABSTRACT

A flowmeter system for measuring the flow and changes in the velocity of sound due to changes in composition or temperature of a fluid medium in a flow tube including transducers which generate acoustic compression waves in the fluid medium, phase lock loop transmitter/receiver circuitry including device for measuring the difference in phase of the acoustic compression waves transmitted upstream relative to that received and for measuring the phase difference of the acoustic compression waves transmitted downstream relative to that received and producing a sum signal dependent upon the sum of the two measured phase differences, device for producing a difference signal proportional to the difference of the two measured phase differences which provides an output signal representing the direction and magnitude of the measured flow device for automatically adjusting the frequency of the acoustic compression waves so that their wave lengths remains constant, said means for automatically adjusting the frequency including a voltage controlled oscillator whose output frequency changes with a change in the sum signal, and synchronous clock device coupled to the output of the voltage controlled oscillator for providing a time base for the entire circuit which is synchronized with the output frequency of the voltage controlled oscillator.

8 Claims, 3 Drawing Figures

FLOWMETER SYSTEM WITH SYNCHRONOUS CLOCK FOR GENERATION OF TIMING SIGNALS

RELATED APPLICATIONS

U.S. Application for U.S. Pat. No. 224,785 entitled "Flowmeter System with Ultrasonic Energy Improvement in Equilibration" by R. S. Loveland, filed even date herewith; U.S. Application U.S. Pat. No. 224,725 "Flowmeter System Improved Dynamic Range" by R. S. Loveland, filed even date herewith; U.S. Application for U.S. Pat. No. 224,724 entitled "Flowmeter System With Improved Loop Gain" by R. S. Loveland, filed even date herewith; and U.S. Application for U.S. Pat. No. 224,723 entitled "Flowmeter System With Digital Phase Shifter and Calibration" by R. S. Loveland, filed even date herewith.

BACKGROUND OF THE INVENTION

This invention relates to acoustical flowmeter systems and is particularly directed to an improvement in the acoustical flowmeters of the type described and claimed in the U.S. Pat. No. 4,003,252 entitled "Acoustical Wave Flowmeter" by E. J. DeWath which issued Jan. 18, 1977 and the flowmeter system of the type described and claimed in the U.S. Pat. No. 4,164,865 entitled "Acoustical Wave Flowmeter" by L. G. Hall and R. S. Loveland which issued Aug. 21, 1979.

The invention of DeWath was directed to a flow meter having an unobstructed tubular wall thereby eliminating all impediments to the flow path of the fluid and eliminating all cavities in which debris might collect. The advantages of such a configuration is fully set forth in the DeWath Patent. To measure flow of a selected fluid in the DeWath flowmeter, however, required a calibration for that particular fluid and required a recalibration if the flow of a different fluid was to be measured since the flowmeter was not responsive to changes in fluid species or densities.

The Hall and Loveland invention improved the DeWath flowmeter by providing a flowmeter that measured flow accurately regardless of changes in fluid composition or temperature and by providing a flowmeter with a means for determining a change in velocity of sound of the fluid being measured.

In order to accomplish this, the Hall and Loveland acoustical wave flowmeter system had two spaced apart crystal transducers in the wall of the flowmeter conduit (sometimes called a cavity) to produce ultrasonic acoustic compressions at selected frequencies in the fluid within the cavity. The transducers were alternately switched into a transmit and a receive mode to generate upstream and downstream transmitted and received signals with an automatic means to adjust the transmitted frequencies to compensate for changes in velocity of the acoustic compressions in the fluid caused by changes in fluid composition and temperature. The electronic circuitry involved in the Hall and Loveland flowmeter system include means for measuring and storing signals representing the phase difference between the transmitting transducer signal producing the acoustic compressions and the signal produced by the receiving transducer during each of two successive transmit/receive cycles. Circuit means were provided to determine the difference between the signals representing the two successive phase differences wherein the sign of the difference corresponds to the direction of the fluid flow and the magnitude of the difference corresponds to the rate of fluid flow through the flowmeter. Circuit means were also provided to add the two successive phase difference signals together to obtain a signal proportional to the velocity of sound in the fluid moving through the flowmeter. This latter signal indicated the change in composition of the fluid flowing through the meter.

The Hall and Loveland system utilized a phase lock loop in the receiver/transmitter system and operated from a fixed low frequency clock source, sometimes called a free running clock, for, among other things, alternately turning the transmitter and receiver transducer ON and OFF and for operating other components of the circuitry. In order to accomplish the frequency change due to a change in the sum of the two phase differences of the transmitted and received signals of two successive transmit receive cycles (in order to maintain the energy in the acoustic compressions the same), a voltage controlled oscillator (VCO) of a higher frequency than the system clock frequency was used.

However, with the base for all of the timing (gating) signals being held constant and with the frequency of operation of other parts of the system changing according to the frequency transmitted by the voltage controlled oscillator, the fundamental of the transmitted frequency mixed with a higher order harmonic of the low constant clock frequency. This introduced a beat frequency which resulted in a zero drift output signal from the flowmeter. This was objectionable because it indicated output drifts as much as 50 milliliters per second which would change in magnitude as the the frequency of operation changed. The result of the output zero drift was to indicate a flow when there was none.

The source of error was found to be due to the fact that the signal integrator, which immediately follows the phase detector, was integrating a different number of phase detected cycles for the upstream than for the downstream transmissions. This was because the number cycles occurring within 1.25 millisecond period would change in a manner proportional to the beat frequency. The magnitude of the error would be zero when the beat frequency was at a null and would increase in magnitude as the beat frequency increased until a new null would be reached at the next multiple harmonic and the cycle would repeat.

This invention improves the patented system by eliminating the free running constant frequency clock and by utilizing a divided down submultiple of the frequency of the VCO for all timing signals used in the flowmeter system. Thus, with a fixed number of phase detected signals, all problems of offset due to the use of a separate time base clock have been eliminated.

Accordingly, it is a primary object of this invention to provide a synchronous clock for the flowmeter system which eliminates offset errors introduced into the system by the combination of a free running constant frequency clock source and a variable frequency oscillator in the system.

Still another object of this invention, more specifically stated, is to provide a flowmeter system with a clock frequency as the basis for the system operation which is a divided down submultiple of the variable frequency voltage controlled oscillator in the system.

SUMMARY OF THE INVENTION

The flowmeter system which meets the foregoing objects comprises means defining a path for confining the flow of a fluid medium therethrough, first and second transducers disposed along said flow path for generating and receiving acoustic compression waves in the fluid medium upstream and downstream between the transducers, phase lock loop transmitter/receiver circuitry including means for measuring the phase difference of the acoustic compression waves transmitted upstream relative to that received and for measuring the phase difference of the compression waves transmitted downstream relative to that received, means for producing a voltage signal representing the sum of the upstream and downstream phase differences between transmitted and received waves to control the VCO frequency, means responsive to said voltage signal for automatically adjusting the frequency of the acoustic compression waves to maintain a constant compression wave length in the fluid medium, said means for automatically adjusting the frequency including a voltage controlled oscillator coupled to the means for producing a voltage signal, and a clock synchronized to the changes in frequency of the acoustic compression waves comprising means coupled to the output of said voltage controlled oscillator for providing a gating frequency for the entire circuit means dependent upon the output frequency of the voltage controlled oscillator.

DETAILED DESCRIPTION

Figure 1:
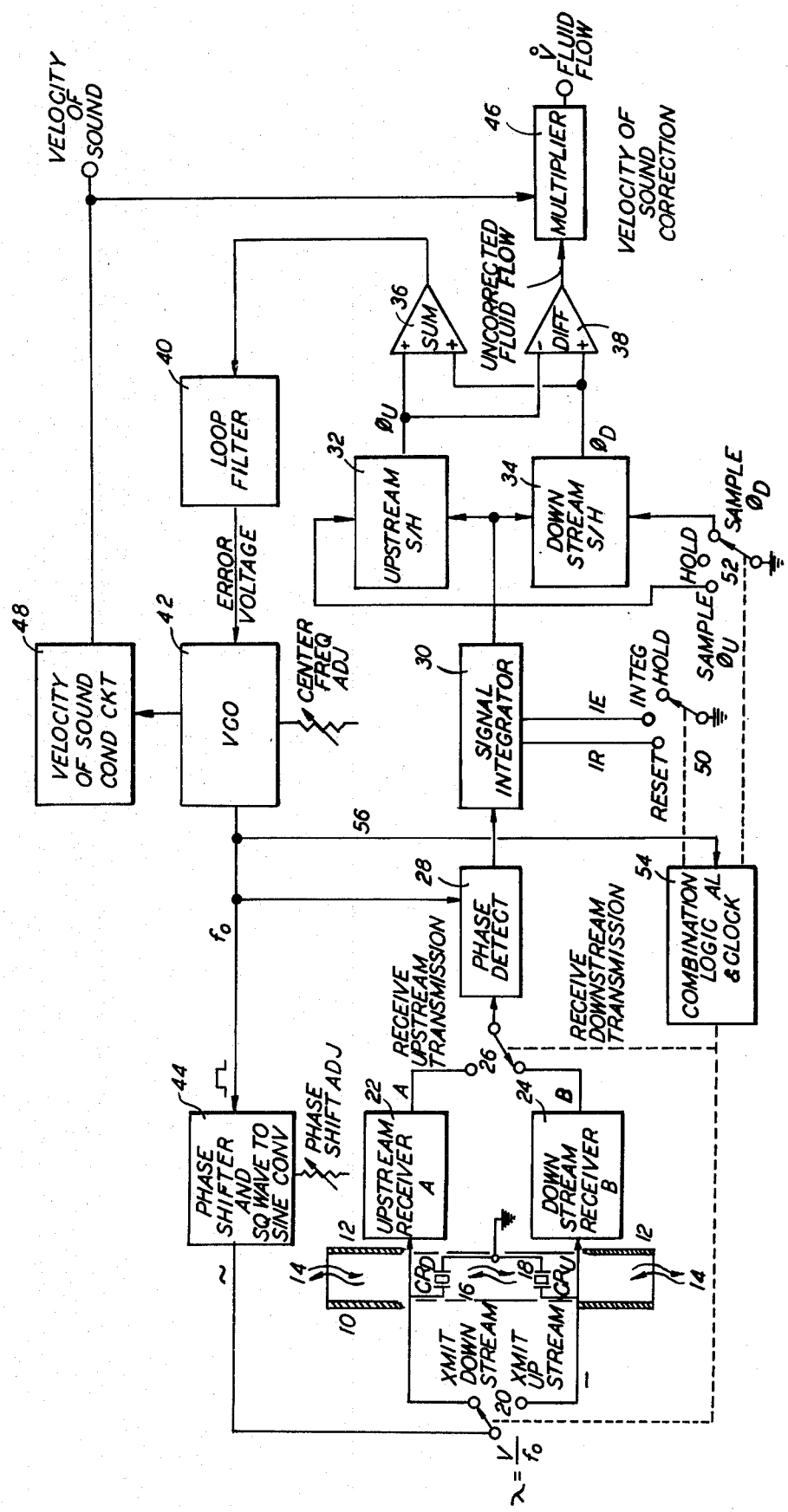
FIG. 1 is a schematic diagram of the flowmeter including the transducers and a block diagram of the electronic circuitry associated therewith.

FIG. 1 illustrates the flowmeter system of the present invention which includes a transducer assembly 10, shown in longitudinal section, which comprises a substantially cylindrical body having a central cylindrical opening, or bore 12, through which a fluid medium flows in both directions, as indicated by the arrows 14.

The transducer assembly is made generally in accordance with the description in the U.S. Patent to DeWath, supra, and is provided with spaced apart cylindrical crystal transducers whose inner diameters are substantially coextensive with the cylindrical bore 12 so that the wall is substantially uniform with no obstructions or cavities to provide a place for particulate matter to collect or to provide an impediment for the flow of fluid therethrough. The purpose of the transducers is described in the DeWath patent and in the Hall and Loveland patent, supra.

While the Hall and Loveland patent also showed and described, in great detail, control circuitry for operating the crystal transducers to accomplish the desired results, for the purpose of this invention, this circuitry has been simplified into block diagrams and reference can be made to this patent if more detailed information on the operation of the circuit is thought necessary.

As can be seen in FIG. 1, the two ultrasonic crystal transducers, represented by crystals 16 and 18, also identified as $CR_D$ and $CR_U$, are alternately each connected to the transmission control circuitry via a switching mechanism 20. When one transducer is connected to the transmission circuitry via switching mechanism 20, the other transducer is in the receive mode the output of which in turn is connected via a second switching mechanism 26 to a phase detector 28, a signal integrator 30 and two sample-and-hold circuits 32 and 34, identified as upstream and downstream. The outputs of these two sample-and-hold circuits are connected to two operational amplifiers, one identified as a summing amplifier 36 and the other identified as a difference amplifier 38. The output of the summing amplifier 36 will indicate the velocity of sound and the output of the difference amplifier will indicate the magnitude and direction of the measured fluid flow. The output of the summing amplifier is connected to a loop filter 40 and to a voltage controlled oscillator 42 (VCO) which is connected back to the phase detector 28 and to a phase shifter and square-wave-to-sine wave converter 44. The phase shifter and converter 44 output is connected back to the first switching mechanism 20. Also like the summing amplifier, the output of the difference amplifier 38 is connected to the VCO 42 but through a multiplier 46 and a velocity of sound conditioning circuit 48. One output of the multiplier is the magnitude and direction of the fluid flow as stated above and the second output represents the relative velocity of sound. Shown connected by dotted lines are the first and second switching mechanisms 20 and 26 and two additional switching mechanisms 50 and 52 all under the control of a combinational logic and clock circuit 54. The circuit 54 alternates transmit and receive functions of the two crystal transducers 16 and 18, alternates the output of the upstream and downstream receivers 22 and 24, operates the integrator 30 between reset, integrate and hold functions and, finally, operates the upstream and downstream sample-and-hold circuits 32 and 34 through a sample, hold, and sample function.

As shown in this Figure, the ultrasonic crystals 16 and 18 are alternately switched into either the transmit or receive mode by the combinational logic circuit. Thus, while one crystal is receiving, the other crystal is transmitting.

For each transmit/receive cycle, the phase difference between the transmit signal and the received signal is detected by the phase detector 28. The average value is determined for each transmit/receive cycle by the integrator circuit 30 which goes through an integrate, hold and reset mode for each transmit/receive cycle. During each integrator hold period, the respective sample/hold circuit for the upstream phase and the downstream phase is ready to accept the new signal (sample mode) as data is available at the integrator output. The upstream and downstream sample/hold circuits are updated with new data at the end of each respective transmit/receive cycle and stores (holds) the information during the wait period.

In the differential amplifier 38, the stored values are then subtracted with the output indicating the direction and magnitude of the fluid flow. In addition, the same stored values are added together in the summing amplifier to determine if a common mode change has occurred in the fluid medium. A common mode change is caused by a change in the velocity of the ultrasound which, in turn, may be due to either temperature or fluid species change. The result is that the sum of the upstream and downstream data, held by the respective sample-and-hold circuits, changes in a manner which causes an error voltage signal at the voltage controlled oscillator (VCO) 42 input to change the transmit frequency in a direction which returns the wave length of the ultra-sound frequency to its original value thereby keeping the wave length constant.

The components of the control circuitry thus far described correspond to the control circuitry of the flowmeter system of the Hall and Loveland patent; it being understood that the foregoing is a simplification of the patented control circuitry. For example, the switching mechanism 20 in this disclosure is actually a combination of high speed transistorized switches comprised of transistors Q1 thru Q8 controlled from the clock source by pulses X,Y, Q3 and $\overline{Q3}$ applied to their respective inputs, switching mechanism 26 are transistors Q9 and Q10 with pulses A & B applied to their respective inputs, etc. Other switching mechanisms exist in the circuitry of the patent through the operation of the clock source but otherwise the block diagrams correspond to the patented circuitry. It is understood that the other switching mechanisms were shown here to illustrate the operation of the circuitry in the block diagram only.

In FIG. 1, there is shown a conductor line 56 connecting the VCO 42 to the combinational logic and clock circuit 54 thereby indicating the synchronization of the clock with the output of the VCO. A more detailed description of this synchronization is described in connection with FIG. 2 to which attention is now directed.

Figure 2:
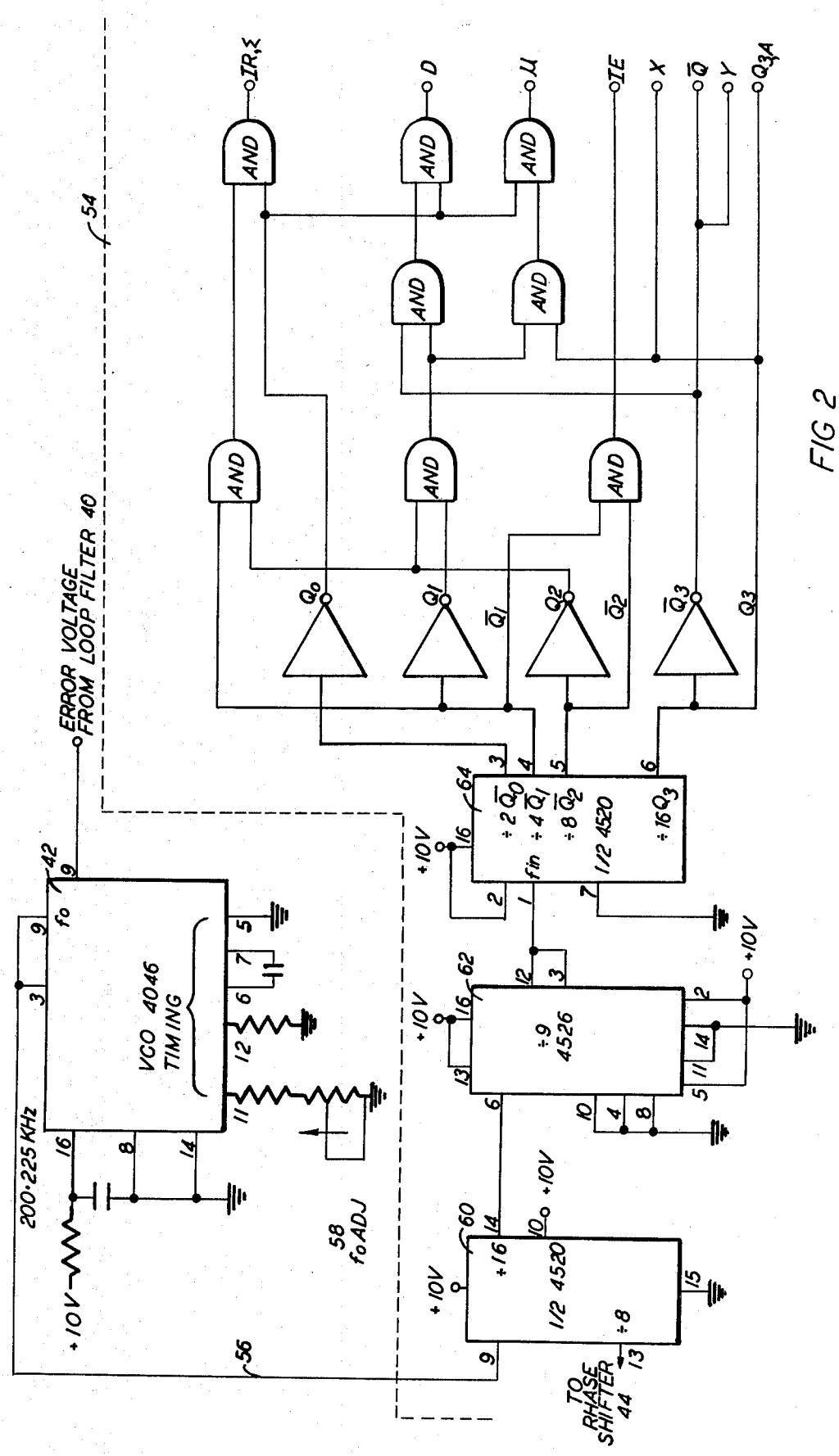
FIG. 2 is the detailed circuit diagram of a timing pulse generator for controlling operations of the circuit.
Figure 3:
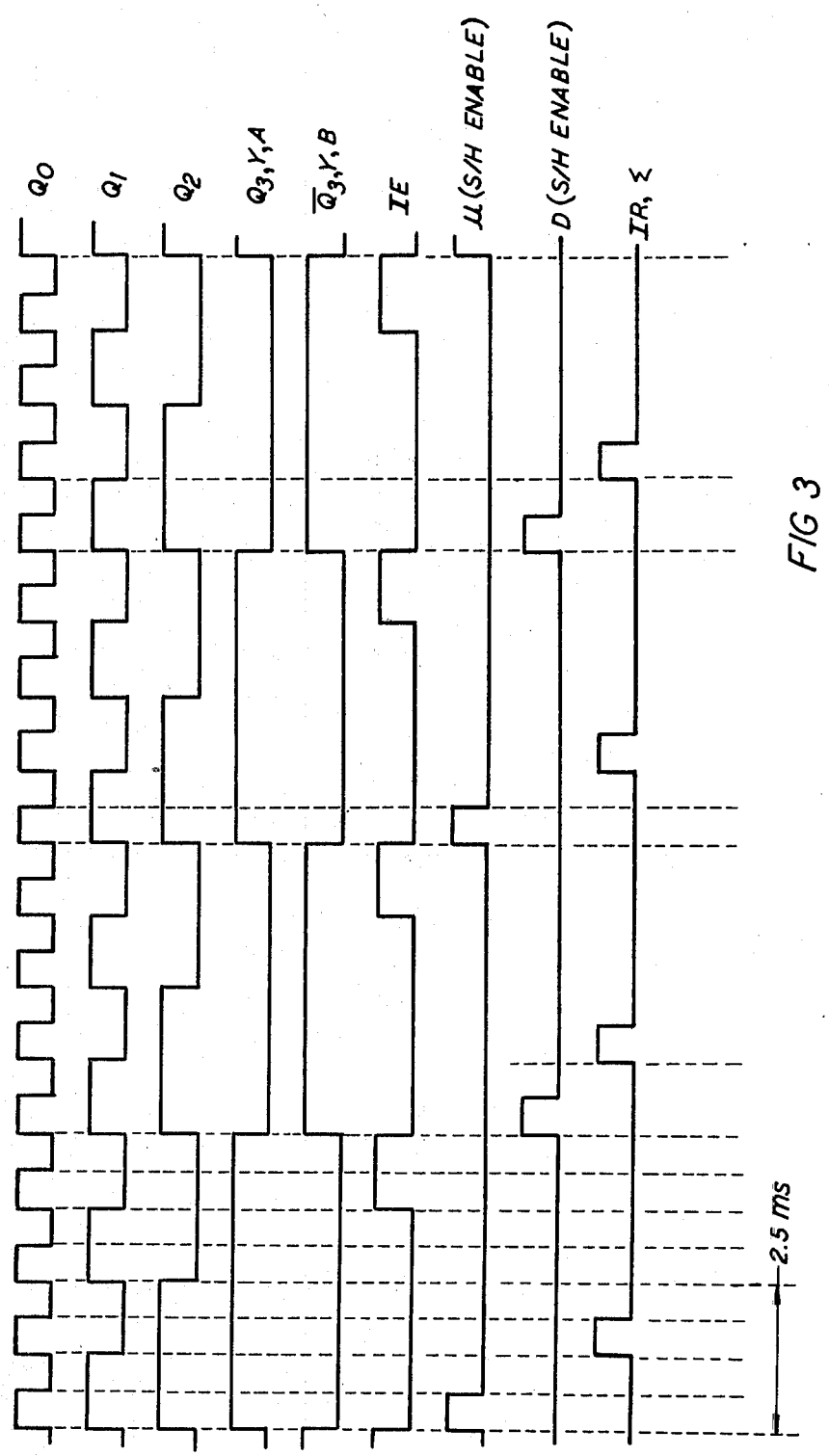
FIG. 3 is a timing pulse chart for the circuit of FIG. 2.

Briefly, the circuit of FIG. 2 comprises VCO 42, an integrated circuit (phase lock loop) type 4046, to which is coupled a resistance and capacitor network 58 including a variable resistor for adjusting the open loop frequency connected to pins 11,12,6 and 7 respectively. The VCO is coupled at input pin 9 to the loop filter 40 and VCO output pin 4 is connected to a series of integrated circuits 60,62, and 64 which are frequency dividers used for generation of timing signals. Integrated circuit 60 is connected at pin 9 to the output of the VCO and its ouput pin 14 is connected to input pin 6 of integrated circuit 62. The output pin 12 of integrated circuit 62 is connected to pin 1 of integrated circuit 64 and pins 3,4,5 and 6 give an output $\overline{Q0}, \overline{Q1}, \overline{Q2}$ and Q3, respectively. The signals produced at the pins 3,4,5 and 6 of integrated circuit 60 are combined by the AND and INVERTER gates of FIG. 2 to produce the respective pulse strings as shown in FIG. 3.

The changing of the voltage appearing at pin 9 operates to dynamically shift the frequency of the voltage controlled oscillator to respond to changes in the velocity of sound in the fluid in the manner and for the reasons previously described.

It can be seen since the output of the VCO comprises the input to the series of frequency dividers and thus the frequency at pins 3-6 of integrated circuit 64 will vary in accordance with the frequency at the VCO output pin 4. Thus, the entire gating circuitry will vary according to this frequency, and this eliminates any harmonic beat frequency that has been introduced by reason of having the gating circuitry run from an independent clock source. Thus while FIG. 3 shows pulses such, as Q1, of equal width, the width of these pulses will vary dependent on the width of the square wave from pin 4 of the VCO 42 and all other pulses will vary in width accordingly.

It should be apparent from the foregoing that this invention may be incorporated directly into the circuitry of the Hall and Loveland Patent, supra, to improve its performance, or may be incorporated in circuitry improved by the incorporation of any one or all of the inventions identified under RELATED APPLICATIONS, supra, into a circuit to improve the performance of such circuitry.

What is claimed is:

1. A flowmeter system comprising, in combination:
    transducer means for transmitting acoustic compression waves upstream and downstream in a fluid flowing in a path;
    circuit means for measuring the phase difference between the transducer means in the fluid flow path of the acoustic compression waves transmitted upstream and circuit means for measuring the phase difference between said transducer means in the fluid flow path of the acoustic compression waves transmitted downstream;
    circuit means for producing a difference signal dependent on the difference between the two phase differences, the magnitude and sign of which being directly related to the instantaneous fluid flow rate and its direction;
    circuit means for automatically adjusting the frequency of the acoustic compression waves to a frequency where a fixed wavelength distance, in the fluid flow medium, occurs across the path of the transducer means; and
    signal generating means for producing timing signals for operating said circuit means which relate in frequency to the frequency of said acoustic compression waves.

2. The flowmeter system as claimed in claim 1 wherein said circuit means for continually adjusting the frequency comprises a voltage controlled oscillator and wherein said signal generating means is coupled to the output of said oscillator.

3. The flowmeter system or claimed in claim 2 wherein said signal generating means generator timing signals at a lower frequency than the output frequency of said oscillator.

4. The flowmeter as claimed in claim 2 wherein the frequency generated by the signal generating means is a divided down submultiple of the output frequency of said oscillator.

5. The flowmeter system as claimed in claim 2 wherein said signal generating means comprises frequency dividers.

6. A flowmeter system for measuring a fluid along a path comprising in combination:
    means defining a path for confining a fluid flow
    a first and second transducer disposed along said path;
    a transducer control circuit coupled to said first and said second transducers to cause said first transducer to produce first acoustic compressions in the fluid and said second transducer to produce a first received signal when said first acoustic compression are sensed thereby during a first transmit-receive cycle and to cause said second transducer to produce second acoustic compressions in the fluid and said first transducer to produce a second received signal when said second acoustic compressions are sensed thereby during a second transmit/receive cycle; said control circuit including:

means to switch from said first to said second transmit-receive cycle;

first measurement means to measure a first phase difference comprising the phase difference between the first acoustic compression produced at said first transducer and said first received signal produced by said second transducer during each said first transmit-received cycle;

second measurement means to measure a second phase difference comprising the phase difference between the second acoustic compression produced at said second transducer and said second received signal produced by said first transducer during each second transmit-received cycle;

difference means responsive to said first and said second measurement means to produce a difference signal whose magnitude equals the difference between one said first phase difference and one said second phase difference wherein the magnitude of said difference signal is directly related to the instantaneous fluid flow rate and the algebraic sign of said difference signal represents the direction of fluid flow along the path;

means to automatically adjust the frequency of the acoustic compressions produced by each said transducer to a frequency where a fixed wavelength distance, in the fluid flow medium, occurs across the distance of either said transducer, thereby maintaining operation at the acoustic resonance to maximize the magnitude of the received signal produced at the other transducer so that said difference signal output of the meter is insensitive to the velocity of sound in the fluid; and means for driving said control circuit a frequency which is responsive to the frequency of said compression waves.

7. The flowmeter system as claimed in claim 6 wherein said means to automatically adjust the frequency of said compression waves comprises a voltage controlled oscillator.

8. The flowmeter system as claimed in claim 7 wherein said means for driving said control circuit comprises frequency dividers coupled to the output of said oscillation for generating timing signals which are submultiples of the frequency output of said oscillator.

* * * * *